(12) United States Patent
Summer

(10) Patent No.: US 6,569,444 B2
(45) Date of Patent: May 27, 2003

(54) RUMINANT FEED MATERIAL WITH DECREASED RUMEN DIGESTIBILITY

(75) Inventor: Paul Summer, Oskaloosa, IA (US)

(73) Assignee: Ajinomoto U.S.A., Inc., New York, NY (US)

(*) Notice: Subject to any disclaimer, the term of this patent is extended or adjusted under 35 U.S.C. 154(b) by 0 days.

(21) Appl. No.: 09/777,708

(22) Filed: Feb. 7, 2001

(65) Prior Publication Data

US 2002/0150608 A1 Oct. 17, 2002

(51) Int. Cl.⁷ .................................................. A23K 1/22
(52) U.S. Cl. ..................... 424/438; 424/115; 424/609; 424/663; 424/664; 424/665; 424/679; 424/680; 424/681; 424/710; 424/716; 424/720; 426/61; 426/807
(58) Field of Search ........................... 426/61, 64, 655, 426/656, 807; 424/438, 115, 601, 602, 663, 664, 665, 679, 680, 681, 710, 716, 720; 435/41

(56) References Cited

U.S. PATENT DOCUMENTS 3,901,976 A * 8/1975 Ruth et al. ............ 426/69
5,709,894 A    1/1998 Julien
6,123,967 A * 9/2000 Trojka et al. ......... 426/72

FOREIGN PATENT DOCUMENTS

CH  442 947    1/1968
DE  1 222 773  8/1966

OTHER PUBLICATIONS

"Solvents for Soluble Nitrogen Measurements in Feedstuffs," B.A. Crooker et al, 1978 Journal Dairy Science 61, pp. 437–447.
"Effect of Reducing Soybean Protein Solubility By Dry Heat on the Protein Utilization of Young Lambs," H.A. Glimp et al, Jul. 1967, Journal of Animal Science, vol. 26, No. 24, pp. 858–861.
"Ruminal Ammonia Formation in Relation to the Protein Requirement of Sheep," M. I. Chalmers et al, Jun. 1954, Journal of Agricultural Science, vol. 44, Part 3, pp. 254–262.
"Ruminal Ammonia Formation in Relation to the Protein Requirement of Sheep," M. I. Chalmers et al, Jun. 1954, Journal of Agricultural Science, vol. 44, Part 3, pp. 263–269.
"Ruminal Ammonia Formation in Relation to the Protein Requirement of Sheep," E. F. Annison et al, Jun. 1954, Journal of Agricultural Science, vol. 44, Part 3, pp. 270–273.
"Evaluation of Alternative Uses of Condensed Molasses Solubles as a Dietary Ingredient in Cattle Feeds," A. Trenkle et al, 1994 Beef Research Report, pp. 56–58.

* cited by examiner

Primary Examiner—Neil S. Levy
(74) Attorney, Agent, or Firm—Burns, Doane, Swecker & Mathis, LLP

(57) ABSTRACT

A method of preparing a ruminant feed material with decreased nitrogen solubility, comprising mixing a liquid feed product containing a salt with a protein feedstuff. The protein feedstuff contains crude protein in an amount from 30% to 70% by weight. The liquid feed product containing a salt and the protein feedstuff are mixed under conditions sufficient to decrease the nitrogen solubility of the protein source. Also provided is a ruminant feed material with decreased nitrogen solubility.

22 Claims, 3 Drawing Sheets

RUMINANT FEED MATERIAL WITH DECREASED RUMEN DIGESTIBILITY

BACKGROUND OF THE INVENTION

1. Field of the Invention

The present invention relates to a method of preparing a ruminant feed material with decreased rumen digestibility. The present invention also relates to a ruminant feed material with decreased rumen digestibility.

2. Description of the Related Art

The diet of ruminant animals typically includes feedstuffs that contain protein. An adequate amount of protein should be delivered to a ruminant animal to ensure the optimal development of the meat and milk provided thereby. However, some of the protein ingested by the ruminant animal typically becomes degraded in the rumen. For example, an amount of the ingested protein typically is converted to ammonia in the rumen. The amount of protein thus delivered to the small intestine of the ruminant animal typically is less than the total amount of protein ingested, as a significant amount of protein can be lost in the rumen. Therefore, it is beneficial to increase the resistance of the protein to rumen degradation in order to maximize the amount of the ingested protein flowing to the small intestine of the ruminant animal.

In light of the importance of delivering an adequate amount of protein to ruminant animals, methods have been proposed for estimating the rumen degradation resistance of the protein present in ruminant feedstuffs. For example, measuring the amount of ammonia in the rumen can provide a qualitative determination of the resistance of the protein to rumen degradation.

In addition, the rumen degradation resistance of a protein can be qualitatively determined by measuring the nitrogen solubility of the protein. See, e.g., B. A. Crooker et al., "Solvents for Soluble Nitrogen Measurements in Feedstuffs", Journal of Dairy Science, Vol. 61, pp. 437–47 (1977). In this regard, the nitrogen solubility of a particular protein is generally a good indicator of the rumen degradability of the protein. That is, a protein feedstuff having a lower nitrogen solubility generally has a greater resistance to rumen degradation. Thus, decreasing the nitrogen solubility of a protein feedstuff fed to a ruminant animal typically increases the intake of protein by the ruminant animal.

Various documents discuss the significance of the nitrogen solubility of protein present in ruminant animal feedstuffs. See, e.g., Glimp et al., "Effect of Reducing Soybean Protein Solubility by Dry Heat on the Protein Utilization of Young Lambs", Journal of Animal Science, Vol. 26, pp. 858–61 (1967); Chalmers et al., "Ruminal Ammonia Formation in Relation to the Protein Requirement of Sheep", Journal of Agricultural Science, Vol. 44, pp. 254–64 (1954); and Annison et al., "Ruminal Ammonia Formation in Relation to the Protein Requirement of Sheep", Journal of Agricultural Science, Vol. 44, pp. 270–77 (1954). However, each of these documents does not disclose or suggest a method of decreasing nitrogen solubility of a ruminant feed material, according to one aspect of the present invention.

The related art discloses various possible protective agents for reducing the rumen degradation of protein feedstuffs. For example, formaldehyde, ethanol, wood molasses, lignin, acetic acid and the application of heat have been proposed as protective agents. However, use of such agents can have drawbacks. In this regard, formaldehyde is a known carcinogen to humans. Use of ethanol, acetic acid and the application of heat can be costly. In addition, lignin generally has a low nutritional value and can be unpalatable to livestock.

U.S. Pat. No. 5,709,894 (the '894 patent) relates to a feed additive for ruminants. The feed additive comprises dried glutamic acid fermentation solubles, dried corn fermentation solubles or a mixture of dried glutamic acid fermentation solubles and dried corn fermentation solubles. See abstract at lines 1–4. The dried solubles have been dried to a total moisture content of less than 30% by weight at a temperature not less than 80° F. and not more than 90° F. See abstract at lines 4–7. The '894 patent discloses that as a result of the drying, the nonprotein nitrogen fractions of the composition are reduced in their solubility so as to provide rumen bacteria with a sustained release source of ammonia nitrogen. The '894 patent at col. 6, lines 16–21.

The '894 patent relates to reducing the solubility of nonprotein nitrogen fractions. These nonprotein nitrogen fractions are present in the dried glutamic acid fermentation solubles, dried corn fermentation solubles or the mixture of dried glutamic acid fermentation solubles and dried corn fermentation solubles.

Swiss patent document No. 442,947 relates to a process for the production of monosodium glutamate. This document discloses that glutamic acid is produced by fermentation and it is converted into the monosodium salt. The salt is then isolated as a concentrated solution or as a component of a dry powder.

German patent document No. 1,222,773 relates to animal feeds or feed supplements containing a fermentation residue obtained from the production of glutamic acid by fermentation. The fermentation residue comprises solids filtered out of the fermentation medium and the mother liquor of the glutamic acid which has been crystalized and separated out.

In view of the foregoing, a need in the art exists for provision of a ruminant feed material comprising a protein feedstuff having an increased resistance to rumen degradation.

SUMMARY OF THE INVENTION

One object of the present invention is to provide a method of preparing a ruminant feed material having a decreased nitrogen solubility. Another object of the present invention is to provide a ruminant feed material having a decreased nitrogen solubility. The foregoing objectives are met by the present invention. According to one aspect, the present invention relates to a method of preparing a ruminant feed material with decreased nitrogen solubility, comprising mixing a liquid feed product containing a salt with a protein feedstuff. The protein feedstuff contains crude protein in an amount from 30% to 70% by weight. The liquid feed product containing a salt and the protein feedstuff are mixed under conditions sufficient to decrease the nitrogen solubility of the protein feedstuff.

According to a further aspect, the present invention provides a ruminant feed material with decreased nitrogen solubility, comprising a liquid feed product containing a salt contacted with a protein feedstuff. The protein feedstuff contains crude protein in an amount from 30% to 70% by weight. The protein feedstuff has a decreased nitrogen solubility in comparison with the uncontacted protein feedstuff.

According to one aspect, a liquid feed product is mixed with a protein feedstuff to reduce the rumen degradability of the protein feedstuff. That is, the protein feedstuff of the present invention does not comprise a component of the liquid feed product, but is mixed therewith. In contrast, the nonprotein nitrogen fractions disclosed in the '894 patent discussed above, comprise a component of the fermentation solubles and are believed to not have value as bypass protein. The '894 patent does disclose contacting a mixture of fermentation solubles with a wheat middlings carrier. The '894 patent at col. 6, lines 60–64. However, it is believed that the wheat middlings carrier disclosed by the '894 patent does not contain a sufficient amount of crude protein to provide a reduction in rumen degradability comparable to that achieved in the present invention. This aspect of the present invention is discussed in greater detail below.

Further, neither Swiss patent document No. 442,947 nor German patent document No. 1,222,773, each discussed above, relates to decreasing the rumen degradability of a protein feedstuff, as set forth in one aspect of the present invention.

BRIEF DESCRIPTION OF THE DRAWINGS

The objects and advantages of the invention will become apparent from the following detailed description of the preferred embodiments thereof, in connection with the accompanying drawings, in which.

DETAILED DESCRIPTION OF THE PREFERRED EMBODIMENTS OF THE INVENTION

Figure 1:
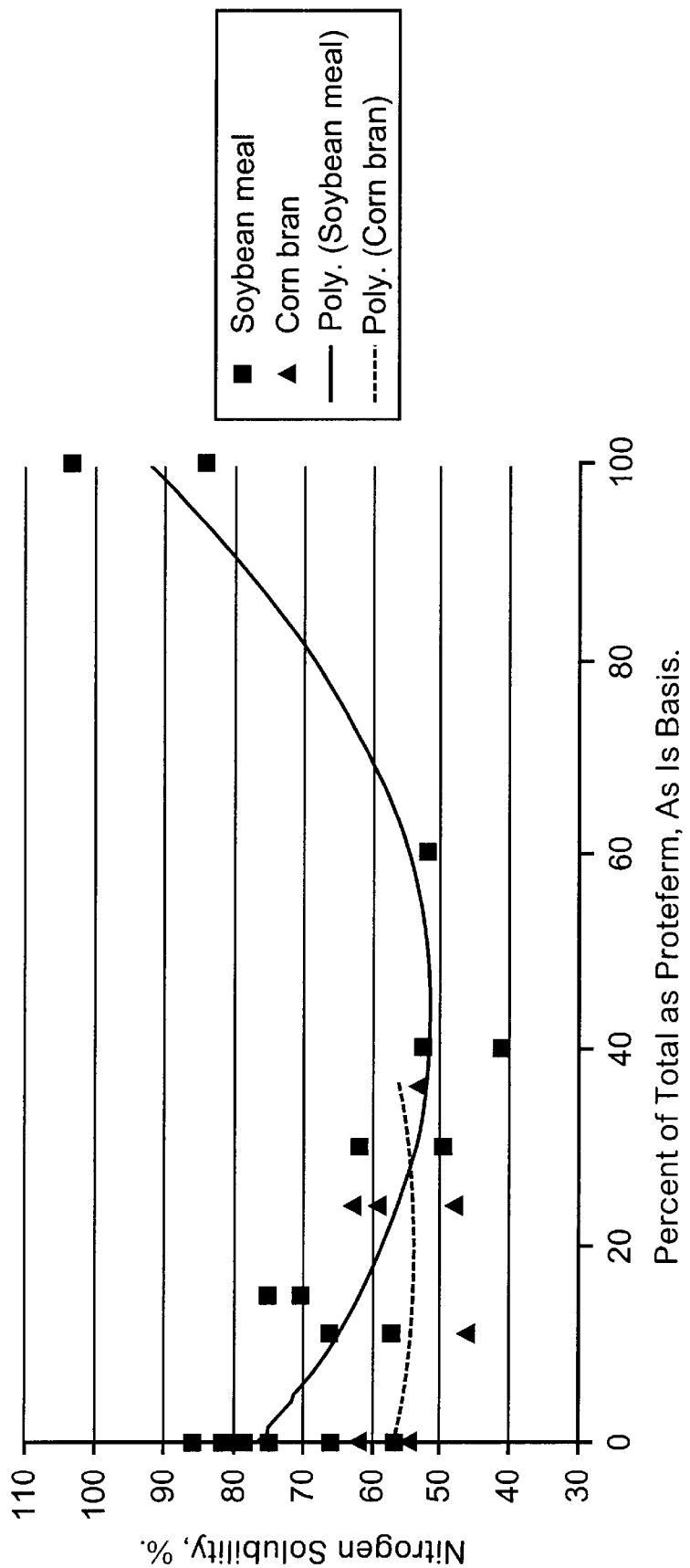
FIG. 1 is a graph illustrating the nitrogen solubility of corn bran or soybean meal mixed with various amounts of a commercially available fermentation product.

According to one aspect of the present invention, a method is provided of preparing a ruminant feed material with decreased nitrogen solubility. The method includes mixing a liquid feed product containing a salt and a protein feedstuff under conditions sufficient to decrease the nitrogen solubility of the protein feedstuff. According to the present invention, decreasing the nitrogen solubility of the protein feedstuff typically is effective for increasing the resistance thereof to rumen degradation. The protein feedstuff with an increased resistance to rumen degradation provides an increased amount of protein to the small intestine of a ruminant animal in comparison with a protein feedstuff that is not subjected to the methods of the present invention. This increased delivery of protein is generally beneficial for the development of the ruminant animal.

The protein feedstuff includes any material comprising protein that can be fed to a ruminant animal. Preferably, the protein feedstuff includes a seed meal. The seed meal can include soybean meal, but is not limited thereto. The soybean meal can include solvent extracted soybean meal and/or expeller extracted soybean meal, preferably solvent extracted soybean meal. Other exemplary protein feedstuffs include corn gluten meal, peanut meal, cottonseed meal, canola meal or a mixture thereof.

The desired amount of crude protein that is present in the protein feedstuff typically depends on several factors including, for example, the type(s) and amount(s) of other component(s) included in the protein feedstuff, the type(s) of liquid feed product employed, the type(s) of the ruminant animal being fed and/or the process conditions employed in the present method. Advantageously, the protein feedstuff preferably comprises crude protein from 30% to 70%, on a weight basis, more preferably from 35% to 65%. For example, each of the exemplary protein feedstuffs set forth above can have a crude protein content within the preferred range. For example, typical crude protein concentrations in the exemplary protein feedstuffs can be as follows: soybean meal, 48%; corn gluten meal, 44%; peanut meal, 34%; cottonseed meal, 48%; and canola meal, 40%.

It has been surprisingly found that the amount of crude protein present in the protein feedstuff generally is a contributing factor in the nitrogen solubility reduction of the protein feedstuff. In this regard, the presence of crude protein in the range of from 30% to 70% can contribute to a marked reduction in the nitrogen solubility of the protein feedstuff when the protein feedstuff is contacted with the liquid feed product containing a salt. This aspect of the present invention is discussed in further detail in the discussion regarding the Examples set forth below.

The amount of the protein feedstuff included in the instant ruminant feed material depends on several factors including, for example, the type(s) of protein feedstuff employed, the type(s) of liquid feed product employed, the type(s) of ruminant animal being fed, and/or the process conditions employed in the present method. Preferably, the protein feedstuff is present in an amount from 20% to 90%, based on the weight of the ruminant feed material, more preferably from 60% to 85%.

In a preferred embodiment, the protein feedstuff comprises particles that are sufficiently small in size to increase the degree of contact between the protein feedstuff and the liquid feed product containing a salt. Increasing the degree of contact generally increases the effect of the liquid feed product upon the protein feedstuff, i.e., an increase in the degree of contact typically results in a reduction of the rumen degradability of the protein feedstuff. For example, the protein feedstuff can comprise, but is not limited to, particles having an average particle size of from 500 to 1500 microns, more preferably from 600 to 800 microns.

Typically, the protein feedstuff includes material in addition to the crude protein contained therein. For example, the protein feedstuff can include carbohydrates, lipids and/or minerals. The additional material can be inherently present in the protein feedstuff and/or can be added thereto as an additive.

The ruminant feed material also includes a liquid feed product containing a salt. The liquid feed product containing a salt can include, for example, condensed fermentation solubles, distiller's solubles, molasses, corn steep liquor, liquid whey or a mixture thereof. The condensed fermentation solubles can include, for example, glutamic acid fermentation solubles, corn fermentation solubles, molasses fermentation solubles or a mixture thereof.

The salt contained in the liquid feed product is preferably selected from the group consisting of a salt of ammonium, magnesium, potassium, calcium and a mixture thereof. Particularly preferred salts include ammonium chloride, ammonium sulfate and magnesium chloride.

The salt is typically initially present in the liquid feed product. According to an alternative embodiment, a liquid feed product with a relatively low concentration of the salt or no salt can be used by adding salt thereto to obtain a desired salt concentration. According to a preferred embodiment, the liquid feed product comprises the salt in an amount from 5% to 65% by weight of the liquid feed product, more preferably from 10% to 25%.

In a preferred embodiment, the liquid feed product containing a salt comprises glutamic acid fermentation solubles. Glutamic acid fermentation solubles which can be used in the present invention include, for example, PROTEFERM®, available from Ajinomoto USA, Inc. located in Eddyville, Iowa. Glutamic acid fermentation solubles contain the fermentation by-products of glutamic acid production and typically include a fermentation broth with spent cell mass, amino acids, peptides and ammonium chloride. For example, the following Table 1 lists the contents of an exemplary sample of glutamic acid fermentation solubles.

TABLE 1

| Component | weight %, as is basis |
|---|---|
| Moisture | 64.0 |
| Ammonia | 5.1 |
| Organic crude protein | 9.8 |
| Minerals | |
| Chloride | 13.5 |
| Sulfur | 0.2 |
| Sodium | 2.5 |
| Potassium | 1.0 |
| Phosphorus | 0.1 |
| Magnesium | 0.1 |
| Calcium | 0.1 |
| Other | |
| Fat | 0.5 |
| Fiber | 0.1 |
| Organic acid | 1.5 |
| Carbohydrates | 1.5 |

This sample of glutamic acid fermentation solubles produced heat in the amount of 521 kcal/lb., measured in a bomb calorimeter.

The liquid feed product containing a salt is preferably present in an amount effective to increase or maximize the rumen degradation resistance of the protein feedstuff. The amount of the liquid feed product containing a salt included in the instant ruminant feed material depends on several factors such as, for example, the type(s) of liquid feed product containing a salt employed, the type(s) of protein feedstuff employed, the type(s) of the ruminant animal being fed, and/or the process conditions employed in the present method. The liquid feed product containing a salt preferably is present in an amount from 5% to 65%, based on the weight of the ruminant feed material, more preferably from 15% to 60%, and most preferably 35%.

The degree of nitrogen solubility reduction in the protein feedstuff of the instant ruminant feed material depends at least on the ratio of the amount of the liquid feed product containing a salt to the amount of the protein feedstuff present in the ruminant feed material. Advantageously, the ratio employed is effective to increase or maximize the rumen degradation resistance of the protein feedstuff.

The liquid feed product containing a salt is mixed with the protein feedstuff under conditions sufficient to decrease the nitrogen solubility of the protein feedstuff.

Typically, the mere mixing of the liquid feed product containing a salt with the protein feedstuff is sufficient for decreasing the nitrogen solubility of the protein feedstuff. In a preferred embodiment, the liquid feed product containing a salt and the protein feedstuff are homogeneously mixed. Methods and equipment known in the art for mixing animal feedstuffs can be used to mix the liquid feed product containing a salt with the protein feedstuff.

The liquid feed product is preferably in liquid form when contacted with the protein feedstuff. Advantageously, drying the liquid feed product prior to mixing same with the protein feedstuff is not required for increasing the rumen degradation resistance of the protein feedstuff. This reduces or avoids the cost associated with drying the liquid feed product prior to the mixing step.

According to another aspect of the present invention, the nitrogen solubility of the protein feedstuff can further be decreased by adjusting various process conditions prior to, during and/or after the mixing of the liquid feed product and the protein feedstuff. For example, the liquid feed product containing a salt and/or the protein feedstuff can be heated. Preferably, the liquid feed product and the protein feedstuff are heated after the materials are mixed.

Heating the mixture of the fermentation product and the protein feedstuff typically is effective for reducing the nitrogen solubility of the protein feedstuff. This is set forth in greater detail in the discussion with respect to Example 4, below. According to an exemplary embodiment, the heat can be applied to the mixture using steam such as, for example, waste steam, and/or by using a forced air oven.

In a preferred embodiment, the resulting mixture of the liquid feed product containing a salt and the protein feedstuff can be heated at a temperature effective to increase or maximize the reduction of nitrogen solubility of the protein feedstuff. For example, the resulting mixture can be heated at a temperature from 20° C. to 400° C., more preferably from 60° C. to 130° C. Preferably, the protein feedstuff itself is not substantially adversely affected by the applied heat. The mixture can be heated for from 10 minutes to 48 hours, more preferably from 30 minutes to 4 hours.

While heating the protein feedstuff at high temperatures, such as 139° C., generally is effective for reducing the rumen degradability of the crude protein therein, it has been surprisingly found that heating the feed material at lower temperatures, such 60° C., can also be effective for decreasing rumen degradability. Therefore, the amount of heat required to reduce the rumen degradability of the mixture of the protein feedstuff and the liquid feed product is generally less than the heat required to reduce the rumen degradability of the protein feedstuff alone.

While heating the feed material reduces rumen degradability, it is believed that, while not being bound to any particular theory, drying the feed material in itself does not substantially contribute to the reduction of rumen degradability. For example, as discussed above, the feed material can be heated using steam. The final moisture level of the feed material can be any practical moisture level for the feed material to be used commercially.

Figure 2:
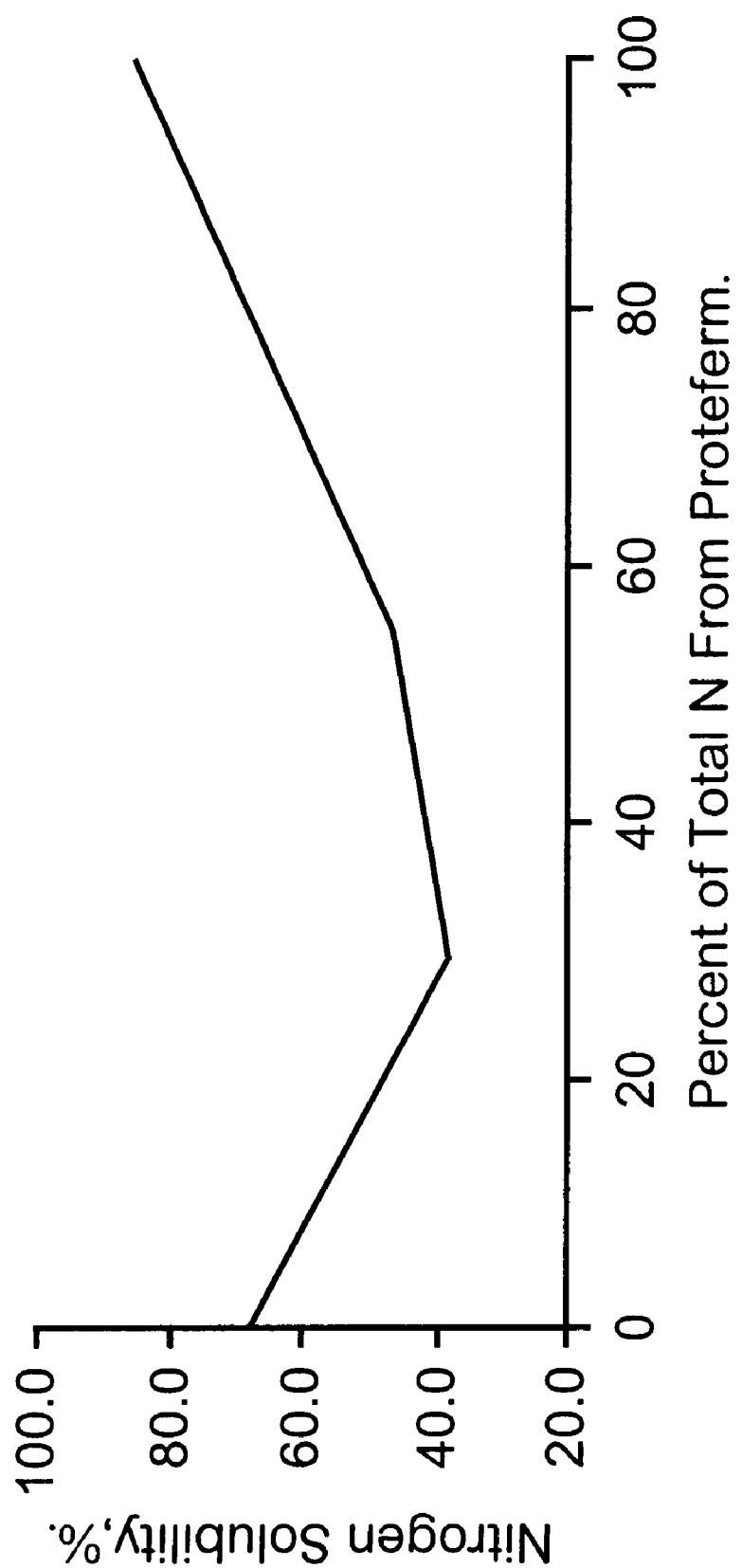
FIG. 2 is a graph illustrating the nitrogen solubility of soybean meal mixed with various amounts of a commercially available fermentation product.

Referring to FIGS. 1 and 2, the ruminant feed material of the present invention can exhibit a reduced nitrogen solubility in comparison with each of the nitrogen solubilities of the uncontacted protein feedstuff and the liquid feed product containing a salt. The results appearing in these figures are further discussed in greater detail below in the discussion of Examples 1–4. According to a preferred embodiment, the nitrogen solubility of the protein feedstuff is reduced in an amount from 7% to 67%, more preferably from 28% to 48%, compared with the weighted mean of the nitrogen solubilities of the uncontacted protein feedstuff and the liquid feed product containing a salt, based on the weight mean.

Figure 3:
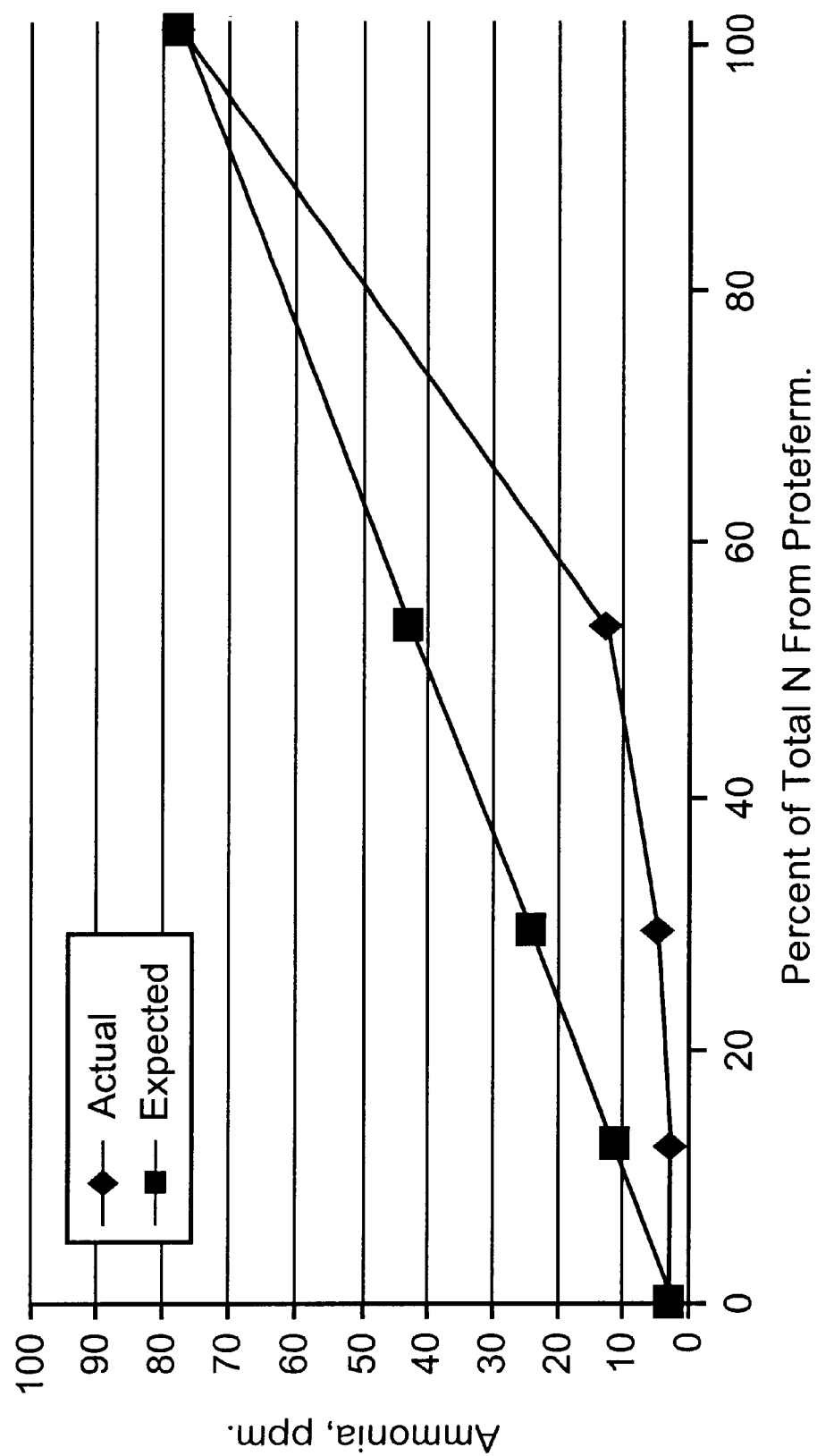
FIG. 3 is a graph illustrating the actual and expected ammonia concentrations produced by the in vitro rumen fermentation of soybean meal mixed with various amounts of a commercially available fermentation product.

As discussed above, the rumen degradation of a protein feedstuff typically produces ammonia. Thus, the degree of rumen degradation can be measured by the amount of ammonia present after fermentation of a ruminant feed material. FIG. 3 shows that the instant ruminant feed materials advantageously exhibit a reduced amount of ammonia produced from the rumen fermentation thereof, in comparison with expected ammonia concentration values. These results are further discussed in greater detail below in the discussion of Example 5.

The ruminant feed material can contain additional material such as, for example, additional nutritive material, preservatives to permit prolonged storage, anti-caking agents to aid flowability, and/or coloring agents to identify treated feed material from untreated feed material. The inventive ruminant feed material can contain additional nutritive materials, particularly when the ruminant feed material is administered by itself. Such additional nutritive materials can include, for example, lipids, vitamins, amino acids, enzymes and/or soluble energy sources such as sugar or starch. Other additives known to those skilled in the art can also be used.

The ruminant feed material can be subjected to further processing for various purposes. For example, the ruminant feed material typically is pelleted to facilitate administration thereof to ruminant animals. In addition, the feed material can be cubed, ground, rolled, expanded and/or conditioned with steam. Cubing typically results in larger sized pellets. Grinding typically results in reducing the particle size of the feed material. Rolling typically alters the particle shape and can be done with or without the use of steam. Expanding processes typically include subjecting the feed material to moisture, pressure and heat. Steam conditioning typically includes subjecting the feed material to moisture and heat. Other processes known to those skilled in the art can also be used.

In order to further illustrate the present invention and the advantages thereof, the following specific Examples are given, it being understood that the Examples are intended only as illustrative and are in no way limiting.

EXAMPLES

In each of the following Examples 1–5 and Comparative Example 1, various ruminant feed material samples were prepared, and the nitrogen solubility of the protein feedstuffs therein were measured. A 5 gram portion of each ruminant feed sample was stirred in 200 ml of 0.2% KOH for 90 minutes at 20° C. Each sample was then brought up to a volume of 250 ml with distilled water and allowed to settle for 30 minutes. A 40 ml portion was decanted from each sample and centrifuged for 10 minutes at 4,000 rpm. Each sample was then filtered through Whatman #1 filter paper and analyzed for Kjeldahl nitrogen.

In each of Examples 1–5, the final nitrogen solubility values were calculated by dividing the total grams of soluble nitrogen by the total grams of nitrogen in each sample. The various weight percent values are on an as is basis, unless specified otherwise. PROTEFERM® was used as the liquid feed product containing a salt (LFP) in each of the Examples. A forced air oven was used to heat the samples which were heated.

Example 1

Nitrogen Solubility of Soybean Meal and Soybean Meal/LFP Mixtures

The nitrogen solubilities were tested of heated soybean meal/LFP mixtures and heated and unheated 100% soybean meal. Solvent extracted soybean meal was used in these examples. Sample Nos. 2–4 were heated at 60° C. for 18 hours. The results are shown in the following Table 2:

TABLE 2

| No. | Feedstuff | Feedstuff, wt. % | LFP, wt. % | Heat Applied? | Nitrogen Solubility |
| --- | --- | --- | --- | --- | --- |
| 1 | Soybean Meal | 100 | 0 | No | 78.47 |
| 2 | Soybean Meal | 100 | 0 | Yes | 74.68 |
| 3 | Soybean Meal | 60 | 40 | Yes | 41.03 |
| 4 | Soybean Meal | 40 | 60 | Yes | 51.81 |

As can be seen from these results, the heated soybean meal and soybean meal/LFP mixture samples had nitrogen solubilities which were lower than that of the unheated soybean meal sample.

Example 2

Nitrogen Solubility of Various Materials

The nitrogen solubilities were tested of 100% corn bran, corn bran/LFP mixtures, 100% soybean meal, soybean meal/LFP mixtures, PROTEFERM® and ammonium chloride (Sample No. 8). The soybean meal tested had a crude protein content of 48% by weight, whereas the corn bran tested had a crude protein content of 11.6% by weight. Sample Nos. 2 and 4 were heated at 60° C. for 48 hours. The results are shown in the following Table 3:

TABLE 3

| No. | Feedstuff | Feedstuff, wt. % | LFP, wt. % | Heat Applied? | Nitrogen Solubility |
| --- | --- | --- | --- | --- | --- |
| 1 | Corn Bran | 100 | 0 | No | 56.82 |
| 2 | Corn Bran | 100 | 0 | Yes | 61.66 |
| 3 | Corn Bran | 75 | 25 | No | 62.83 |
| 4 | Corn Bran | 75 | 25 | Yes | 58.99 |
| 5 | Soybean Meal | 100 | 0 | No | 79.33 |
| 6 | Soybean Meal | 75 | 25 | No | 52.59 |
| 7 | N/A | 0 | 100 | No | 83.77 |
| 8 | N/A | 0 | 0 | No | 94.30 |

As can be seen from the results, Sample No. 6 which contained a soybean meal/LFP mixture exhibited a nitrogen solubility lower than that of the 100% soybean meal Sample No. 5. The corn bran/LFP mixtures, on the other hand, did not exhibit a significant reduction in nitrogen solubility in comparison with the 100% corn bran samples. While not being bound to any particular theory, it is believed that the low crude protein content of the corn bran was a contributing factor to the lack of nitrogen solubility reduction.

Example 3

Nitrogen Solubility of Soybean Meal and Bean Meal/LFP Mixtures

The nitrogen solubilities were tested of 100% soybean meal, soybean meal with water and soybean meal/LFP mixtures. Sample Nos. 2, 3, 5, 7 and 8 were heated at 60° C. for 12 hours. Sample No. 3 included water to take into account any effects caused by the moisture present in the LFP. The results are shown in the following Table 4:

TABLE 4

| No. | Feedstuff | Feedstuff, wt. % | LFP, wt. % | Heat Applied? | Nitrogen Solubility |
|---|---|---|---|---|---|
| 1 | Soybean Meal | 100 | 0 | No | 85.62 |
| 2 | Soybean Meal | 100 | 0 | Yes | 78.29 |
| 3 | Soybean Meal (with water) | 100 | 0 | Yes | 81.53 |
| 4 | Soybean Meal | 85 | 15 | No | 75.02 |
| 5 | Soybean Meal | 85 | 15 | Yes | 70.17 |
| 6 | Soybean Meal | 70 | 30 | No | 61.92 |
| 7 | Soybean Meal | 70 | 30 | Yes | 49.51 |
| 8 | Soybean Meal | 0 | 100 | Yes | 103.16 |

As can be seen from the table, essentially all of the nitrogen in Sample No. 8, which contained 100% PROTEFERM®, was from ammonia and amino acids. When either 15% or 30% PROTEFERM® was mixed with soybean meal, the nitrogen solubility of the mixture was reduced 10.6 and 23.7 percentage units, respectively, compared with the nitrogen solubility of soybean meal alone.

When heat was applied to the mixtures, the nitrogen solubility was reduced by 8.1 and 28.8 percentage units for 15% and 30% PROTEFERM® mixtures, respectively, compared with heated soybean meal alone. Adding water to soybean meal and then applying heat did not reduce the nitrogen solubility. Therefore, while not being bound by any particular theory, it is believed that the moisture content in the PROTEFERM® was not causing the reduction in nitrogen solubility.

Example 4

Nitrogen Solubility of Soybean Meal, LFP and Soybean Meal/LFP Mixtures at Various Temperatures The nitrogen solubility was tested of various unheated and heated solvent extracted soybean meal/LFP mixtures, 100% LFP and soybean meal. To further examine the effect of heat on the nitrogen solubility of the ruminant feed materials, the mixtures (at 22° C.) were subjected to two additional temperature levels (60° C. and 139° C.) for 4 hours.

In this Example, the samples were ground in a coffee grinder to reduce and equalize the particle size. After being stirred in 200 ml of solvent, the samples were not further diluted with water, as in the previous Examples. The results are as follows:

TABLE 5

| No. | Soybean Meal, wt. % | LFP, wt. % | T, ° C. | Nitrogen Solubility |
|---|---|---|---|---|
| 1 | 100 | 0 | 22 | 77.27 |
| 2 | 85 | 15 | 22 | 71.34 |
| 3 | 65 | 35 | 22 | 45.60 |
| 4 | 40 | 60 | 22 | 55.08 |
| 5 | 0 | 100 | 22 | 76.55 |
| 6 | 100 | 0 | 60 | 77.97 |
| 7 | 85 | 15 | 60 | 66.61 |
| 8 | 65 | 35 | 60 | 40.95 |
| 9 | 40 | 60 | 60 | 58.24 |
| 10 | 0 | 100 | 60 | 84.72 |
| 11 | 100 | 0 | 139 | 45.31 |
| 12 | 85 | 15 | 139 | 25.75 |
| 13 | 65 | 35 | 139 | 25.93 |
| 14 | 40 | 60 | 139 | 22.77 |
| 15 | 0 | 100 | 139 | 88.19 |

As can be seen from the results, the soybean meal/LFP mixtures had lower nitrogen solubilities than the solubilities of the soybean meal alone and the LFP alone, at each of the heat levels. Increasing the level of heat resulted in a further decrease in nitrogen solubility of the soybean meal/LFP mixtures compared with 100% soybean meal subjected to the same heat level.

The heated 100% LFP samples (Sample Nos. 10 and 15) did not exhibit a significant reduction of nitrogen solubility, even at elevated temperatures. On the other hand, the nitrogen solubility of the soybean meal Sample No. 11 decreased at 139° C. From these results, it is likely that, while not being bound by any particular theory, the decrease in nitrogen solubility in the soybean meal/LFP mixtures can be mostly or entirely attributed to a decrease of nitrogen solubility in the soybean meal, and not the LFP.

Example 5

In vitro Ammonia Accumulation of Soybean Meal/LFP Mixtures, LFP and Soybean Meal Sample Nos. 1–15 of the instant Example were prepared in the same manner as Sample Nos. 1–15 used in Example 5. The samples were subjected to in vitro rumen fermentation. The resistance to rumen degradation of each sample was determined by measuring the amount of ammonia produced from the fermentation reactions.

Rumen fluid was obtained from a rumen fistulated steer weighing 950 lbs. (431 kg) and consuming a high energy, finishing-type diet, ad libitum. The rumen fluid was strained through 4 layers of cheesecloth and applied to the samples within 40 minutes from the time of collection. Each incubation included 5 mg of nitrogen from each sample, 100 mg starch, 2 ml strained rumen fluid and 20 ml Kansas State Buffer. Samples were incubated for 4, 6, 8, 12 and 24 hours in 4 replicates. After incubation, 0.25 ml sulfuric acid was added to stop fermentation, and the samples were centrifuged for 30 minutes at 4,000 rpm. The ammonia concentration was measured using the hypochlorite reaction and calorimetric method, adapted for measurement by a Technicon auto analyzer. The results are shown in the following Table 6:

TABLE 6

| No. | Protein Feedstuff, wt. % | LFP, wt. % | T,° C. | $NH_3$, ppm, 4 hrs | $NH_3$, ppm, 6 hrs | $NH_3$, ppm, 8 hrs | $NH_3$, ppm, 12 hrs | $NH_3$, ppm, 24 hrs |
|---|---|---|---|---|---|---|---|---|
| 1 | 100 | 0 | 22 | 5.4 | 1.4 | 0.7 | 0.7 | 3.1 |
| 2 | 85 | 15 | 22 | 6.4 | 2.2 | 0.7 | 0.7 | 3.8 |

TABLE 6-continued

| No. | Protein Feedstuff, wt. % | LFP, wt. % | T, °C. | NH₃, ppm, 4 hrs | NH₃, ppm, 6 hrs | NH₃, ppm, 8 hrs | NH₃, ppm, 12 hrs | NH₃, ppm, 24 hrs |
|---|---|---|---|---|---|---|---|---|
| 3 | 65 | 35 | 22 | 14.5 | 2.9 | 1.0 | 1.0 | 6.3 |
| 4 | 40 | 60 | 22 | 45.9 | 11.6 | 5.8 | 1.8 | 12.4 |
| 5 | 0 | 100 | 22 | 117.9 | 115.4 | 106.2 | 103.2 | 28.0 |
| 6 | 100 | 0 | 60 | 7.5 | 1.0 | 0.4 | 0.07 | 3.1 |
| 7 | 85 | 15 | 60 | 8.2 | 2.1 | 1.4 | 1.5 | 4.6 |
| 8 | 65 | 35 | 60 | 13.6 | 1.5 | 1.6 | 0.7 | 5.5 |
| 9 | 40 | 60 | 60 | 37.2 | 8.2 | 4.9 | 4.5 | 11.2 |
| 10 | 0 | 100 | 60 | 143.6 | 84.5 | 54.7 | 45.7 | 50.2 |
| 11 | 100 | 0 | 139 | 1.5 | 1.5 | 1.8. | 1.5 | 0.7 |
| 12 | 85 | 15 | 139 | 1.5 | 1.4 | 1.8 | 1.6 | 0.5 |
| 13 | 65 | 35 | 139 | 9.6 | 1.9 | 1.7 | 1.9 | 1.7 |
| 14 | 40 | 60 | 139 | 24.2 | 5.9 | 3.4 | 1.8 | 8.9 |
| 15 | 0 | 100 | 139 | 113.8 | 64.5 | 56.8 | 34.4 | 46.5 |

To determine whether the soybean meal/LFP mixtures produced an unexpectedly low ammonia concentration, a theoretical, expected ammonia concentration value was calculated for each of the soybean meal/LFP mixture samples taken at each time interval. The amount of nitrogen contributed by the soybean meal to the mixture was used to calculate the expected ammonia concentration values. Table 7 sets forth the amounts of nitrogen contributed by the soybean meal that correspond to the various soybean meal concentrations used in this Example.

TABLE 7

| Soybean Meal, wt. % | LFP, wt. % | Nitrogen from Soybean Meal | Nitrogen from LFP |
|---|---|---|---|
| 85 | 15 | 87.96 | 12.04 |
| 65 | 35 | 70.60 | 29.40 |
| 40 | 60 | 46.26 | 53.74 |

The calculated expected ammonia concentration values are set forth in Table 8 and were calculated by determining the weighted mean of the ammonia concentrations of the 100% soybean meal and the 100% PROTEFERM® measured at a particular time interval.

Table 8 compares the actual ammonia concentrations of Samples Nos. 2–4, 7–9 and 12–14 with the theoretical, expected values thereof. In this table, the "actual" and "expected" ammonia concentration values are in ppm. The "decrease" is the percentage decrease from the expected to the actual ammonia concentration values.

TABLE 8

| No. | 2 | 3 | 4 | 7 | 8 | 9 | 12 | 13 | 14 |
|---|---|---|---|---|---|---|---|---|---|
| 4 hours | | | | | | | | | |
| Actual | 6.4 | 14.5 | 45.9 | 8.2 | 13.6 | 37.2 | 1.5 | 9.6 | 24.2 |
| Expected | 18.9 | 38.5 | 65.9 | 23.9 | 47.6 | 80.7 | 15.1 | 34.2 | 61.9 |
| Decrease | 66.4 | 62.4 | 30.4 | 65.9 | 71.5 | 53.8 | 89.7 | 71.8 | 60.9 |
| 6 hours | | | | | | | | | |
| Actual | 2.2 | 2.9 | 11.6 | 2.1 | 1.5 | 8.2 | 1.4 | 1.9 | 5.9 |
| Expected | 15.1 | 34.9 | 62.7 | 11.0 | 25.6 | 45.9 | 9.1 | 20.0 | 35.4 |
| Decrease | 85.8 | 91.8 | 81.4 | 80.8 | 94.0 | 82.0 | 84.2 | 90.5 | 83.4 |
| 8 hours | | | | | | | | | |
| Actual | 0.7 | 1.0 | 5.8 | 1.4 | 1.8 | 4.9 | 1.8 | 1.7 | 3.4 |
| Expected | 13.4 | 31.7 | 57.4 | 6.9 | 16.4 | 29.6 | 8.5 | 17.6 | 31.4 |
| Decrease | 95.0 | 96.8 | 90.0 | 79.1 | 90.4 | 83.6 | 78.9 | 90.5 | 89.3 |
| 12 hours | | | | | | | | | |
| Actual | 0.7 | 1.0 | 1.8 | 1.5 | 0.8 | 4.5 | 1.6 | 1.9 | 1.8 |
| Expected | 13.1 | 30.9 | 55.8 | 6.1 | 13.9 | 24.9 | 5.5 | 11.2 | 19.2 |
| Decrease | 95.0 | 96.8 | 96.8 | 75.1 | 94.6 | 81.9 | 70.3 | 83.0 | 90.8 |
| 24 hours | | | | | | | | | |
| Actual | 3.8 | 6.3 | 12.4 | 4.6 | 5.5 | 11.2 | 0.5 | 2.7 | 8.9 |
| Expected | 6.1 | 10.5 | 16.5 | 8.8 | 16.9 | 28.4 | 6.3 | 14.2 | 25.4 |
| Decrease | 38.0 | 39.7 | 25.1 | 47.5 | 67.5 | 60.5 | 91.6 | 81.3 | 65.0 |

As can be seen from Table 8, each sample at each time interval exhibited a significant reduction in ammonia concentration in comparison with the expected ammonia concentration thereof. It is therefore apparent that the inventive ruminant feed materials exhibit an increased resistance to rumen degradation.

Comparative Example 1

Nitrogen Solubility of Corn Bran and Corn Bran/LFP Mixtures

The nitrogen solubilities of 100% corn bran and corn bran/LFP mixtures were measured. The temperature of the LFP was 60° C. when mixed with the corn bran. No heat was applied to the mixtures The results are give in Table 9.

TABLE 9

| No. | Feedstuff | Feedstuff, wt. % | LFP, wt. % | Nitrogen Solubility |
|---|---|---|---|---|
| 1 | Corn Bran | 100 | 0 | 54.54 |
| 2 | Corn Bran | 87.5 | 12.5 | 46.18 |
| 3 | Corn Bran | 76.2 | 23.8 | 47.90 |
| 4 | Corn Bran | 64.0 | 36.0 | 53.24 |

As can be seen from the table, when 12.5%, 23.8% or 36.0% LFP was mixed with corn bran, the nitrogen solubility was reduced by 8.4, 6.6, and 1.3 percentage units, respectively. These amounts of nitrogen solubility reduction are generally less than that achieved in comparable mixtures of soybean meal and LFP. As stated above, it is likely that the difference in reduction of the nitrogen solubility can be attributed at least to the low protein content of the corn bran.

While the invention has been described in detail with reference to specific embodiments thereof, it will be apparent to one of ordinary skill in the art that various changes and modification can be made, and equivalents employed without departing from the scope of the claims.

What is claimed is:

1. A method of preparing a ruminant feed material with decreased nitrogen solubility, comprising mixing a liquid feed product containing a salt with a protein feedstuff, wherein the protein feedstuff contains crude protein in an amount from 30% to 70% by weight, wherein the protein feedstuff comprises a material selected from the group consisting of soybean meal, corn gluten meal, peanut meal, cottonseed meal, canola meal and a mixture thereof, wherein the liquid feed product containing a salt comprises glutamic acid fermentation solubles, wherein the liquid feed product containing a salt and the protein feedstuff are mixed under conditions sufficient to decrease the nitrogen solubility of the protein feedstuff, wherein the salt is an inorganic salt selected from the group consisting of ammonium, magnesium, potassium, calcium and a mixture thereof, wherein the protein feedstuff comprises particles having an average particle size of from 500 to 1500 microns, and wherein the liquid feed product containing a salt is present in an amount from 5% to 65% by weight of the ruminant feed material.

2. The method according to claim 1, wherein the liquid feed product containing a salt further comprises a material selected from the group consisting of condensed fermentation solubles, distiller's solubles, molasses, corn steep liquor, liquid whey and a mixture thereof.

3. The method according to claim 1, wherein the liquid feed product containing a salt and the protein feedstuff are homogeneously mixed.

4. The method according to claim 1, wherein the ruminant feed material comprises the liquid feed product containing a salt in an amount of from 5% to 65%, based on the weight of the ruminant feed material.

5. The method according to claim 1, wherein the liquid feed product containing a salt comprises the salt in an amount of from 5% to 65%, based on the weight of the liquid feed product containing a salt.

6. The method according to claim 1, wherein the ruminant feed material comprises the protein feedstuff in an amount of from 20% to 90%, based on the weight of the ruminant feed material.

7. The method according to claim 1, wherein the protein feedstuff comprises crude protein in an amount from 35% to 65% by weight.

8. The method according to claim 1, wherein the protein feedstuff comprises soybean meal.

9. The method according to claim 1, further comprising heating the mixture of the liquid feed product containing a salt and the protein feedstuff at a temperature effective to further decrease the nitrogen solubility of the protein feedstuff.

10. The method according to claim 9, wherein the mixture of the liquid feed product containing a salt and the protein feedstuff is heated at a temperature from 20° C. to 400° C.

11. The method according to claim 1, wherein the nitrogen solubility of the protein feedstuff is 7% to 67% less than the weighted mean of the nitrogen solubilities of the uncontacted protein feedstuff and the liquid feed product containing a salt, based on the weights of the uncontacted protein feedstuff and the liquid feed product containing a salt.

12. The method according to claim 11, wherein the nitrogen solubility of the protein feedstuff is 28% to 48% less than the weighted mean of the nitrogen solubilities of the uncontacted protein feedstuff and the liquid feed product containing a salt, based on the weights of the uncontacted protein feedstuff and the liquid feed product containing a salt.

13. A ruminant feed material with decreased nitrogen solubility, comprising a liquid feed product containing a salt contacted with a protein feedstuff, wherein the protein feedstuff contains crude protein in an amount from 30% to 70% by weight, wherein the protein feedstuff comprises a material selected from the group consisting of soybean meal, corn gluten meal, peanut meal, cottonseed meal, canola meal and a mixture thereof, wherein the liquid feed product containing a salt comprises glutamic acid fermentation solubles, wherein the protein feedstuff has a decreased nitrogen solubility in comparison with the uncontacted protein feedstuff, wherein the salt is an inorganic salt selected from the group consisting of ammonium, magnesium, potassium, calcium and a mixture thereof, wherein the protein feedstuff comprises particles having an average particle size of from 500 to 1500 microns, and wherein the liquid feed product containing a salt is present in an amount from 5% to 65% by weight of the ruminant feed material.

14. The ruminant feed material according to claim 13, wherein the liquid feed product containing a salt further comprises a material selected from the group consisting of condensed fermentation solubles, distiller's solubles, molasses, corn steep liquor, liquid whey and a mixture thereof.

15. The ruminant feed material according to claim 13, wherein the ruminant feed material comprises the liquid feed product containing a salt in an amount of from 5% to 65%, based on the weight of the ruminant feed material.

16. The ruminant feed material according to claim 13, wherein the liquid feed product containing a salt comprises the salt in an amount of from 5% to 65%, based on the weight of the liquid feed product containing a salt.

17. The ruminant feed material according to claim 13, wherein the ruminant feed material comprises the protein feedstuff in an amount of from 20% to 90%, based on the weight of the ruminant feed material.

18. The ruminant feed material according to claim 13, wherein the protein feedstuff comprises crude protein in an amount from 35% to 65% by weight.

19. The ruminant feed material according to claim 13, wherein the protein feedstuff comprises soybean meal.

20. The ruminant feed material according to claim 13, wherein the liquid feed product containing a salt and the protein feedstuff comprise a substantially homogeneous mixture.

21. The ruminant feed material according to claim 13, wherein the nitrogen solubility of the protein feedstuff is 7% to 67% less than the weighted mean of the nitrogen solubilities of the uncontacted protein feedstuff and the liquid feed product containing a salt, based on the weights of the uncontacted protein feedstuff and the liquid feed product containing a salt.

22. The ruminant feed material according to claim 21, wherein the nitrogen solubility of the protein feedstuff is 28% to 48% less than the weighted mean of the nitrogen solubilities of the uncontacted protein feedstuff and the liquid feed product containing a salt, based on the weights of the uncontacted protein feedstuff and the liquid feed product containing a salt.

* * * * *